United States Patent [19]

Parzl et al.

[11] Patent Number: 5,024,122
[45] Date of Patent: Jun. 18, 1991

[54] TRANSMISSION HOUSING WITH A SUPPORT FOR A SHAFT CARRYING AT LEAST ONE GEAR

[75] Inventors: Franz Parzl, Woerthsee; Johann Eichinger, Vaterstetten, both of Fed. Rep. of Germany

[73] Assignee: Carl Hurth Maschinen- und Zahnradfabrik GmbH & Co., Munich, Fed. Rep. of Germany

[21] Appl. No.: 555,815

[22] Filed: Jul. 18, 1990

Related U.S. Application Data

[63] Continuation of Ser. No. 243,077, Sep. 9, 1988, abandoned.

[30] Foreign Application Priority Data

Oct. 3, 1987 [DE] Fed. Rep. of Germany ...... 3733567

[51] Int. Cl.$^5$ .............................................. F16H 57/02
[52] U.S. Cl. ..................................... 74/606 R; 74/417
[58] Field of Search ................... 74/606 R, 417, 423, 74/424, 606 R; 384/255, 447, 583, 296; 105/218.1, 219; 295/42.1, 37, 36.1

[56] References Cited

U.S. PATENT DOCUMENTS

| 2,755,686 | 7/1956 | Bade | 74/417 X |
|---|---|---|---|
| 3,033,056 | 5/1962 | Lennon | 74/606 R |
| 3,145,582 | 8/1964 | Wagner | 74/606 R |
| 3,150,533 | 9/1964 | Wallgren | 74/606 R X |
| 3,361,490 | 1/1968 | Bassan | 384/255 X |
| 3,888,134 | 6/1975 | Miranda | 74/606 R X |
| 3,954,120 | 5/1976 | Zimmerer et al. | 74/606 R X |
| 3,964,335 | 6/1976 | Gerard | 74/425 |
| 3,993,155 | 11/1976 | Tkachenko | 74/606 R X |
| 4,024,774 | 5/1977 | Johnson | 74/606 R |
| 4,112,786 | 9/1978 | Thomas | 464/178 X |
| 4,148,262 | 4/1979 | Eichinger | 74/417 X |
| 4,344,501 | 8/1982 | Jerry et al. | 74/606 R X |
| 4,409,904 | 10/1983 | Eichinger et al. | |
| 4,524,638 | 6/1985 | Van Hee | 74/665 GA X |
| 4,697,527 | 10/1987 | Eichinger . | |

FOREIGN PATENT DOCUMENTS

| 2256150 | 5/1974 | Fed. Rep. of Germany | 74/606 |
|---|---|---|---|
| 3327134 | 2/1985 | Fed. Rep. of Germany . | |
| 52-64562 | 5/1977 | Japan | 74/467 |

*Primary Examiner*—Rodney M. Lindsey
*Attorney, Agent, or Firm*—Flynn, Thiel, Boutell & Tanis

[57] ABSTRACT

A shaft support structure for a rotatable shaft having at least one gear thereon, the shaft and gear being oriented in a transmission housing. The shaft is twice supported: once directly on the transmission housing in one opening, and once in a bearing bracket which is provided in a second opening in the transmission housing. The axially spaced openings for the shaft in the transmission housing are out of alignment. However, the support structure in the transmission housing for the shaft provides an axially aligned support for the shaft. The bearing bracket effects a centering of the shaft support in the transmission housing.

4 Claims, 1 Drawing Sheet

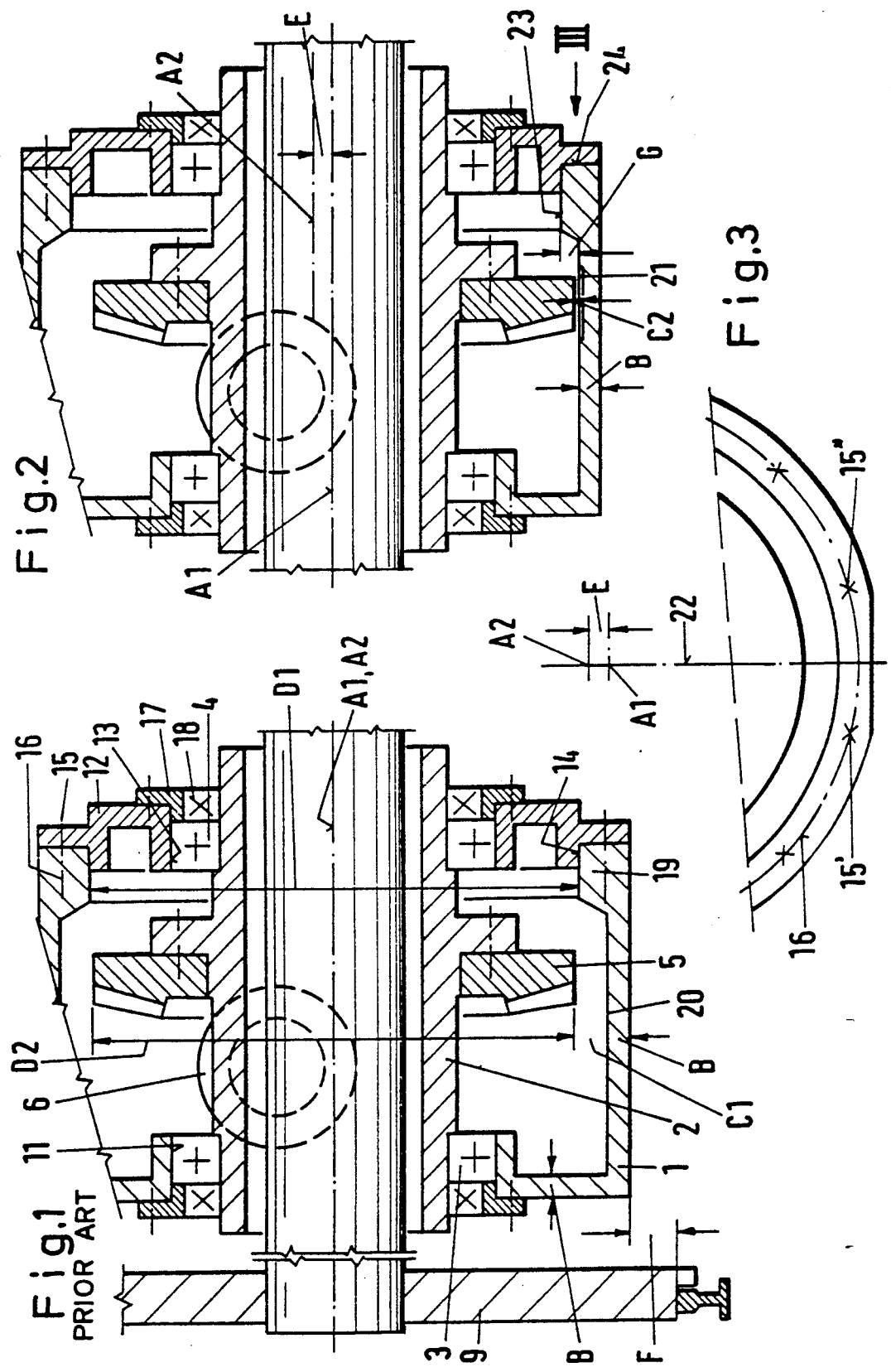

TRANSMISSION HOUSING WITH A SUPPORT FOR A SHAFT CARRYING AT LEAST ONE GEAR

This application is a continuation of U.S. Ser. No. 07/243,077, filed Sept. 9, 1988, now abandoned.

FIELD OF THE INVENTION

The invention relates to a transmission housing having a support for a shaft carrying at least one gear.

BACKGROUND OF THE INVENTION

The invention is based on a state of the art as it is known from DE-OS 33 27 134 and DE-OS 33 37 695 (corresponding to U.S. Pat. No. 4,697,527). The outside dimensions are thereby usually determined by the centering diameter of the bearing bracket in the housing, which centering diameter is predetermined by the gear (or rather by the largest gear in the case of several gears), and by the screws which are used for fastening the bearing bracket to the housing and which are arranged on a perforated circle surrounding the centering diameter; because the housing must have a sufficient thickness for the threaded hole for receiving these screws. Thus, a space remains between the (largest) gear and the radially adjacent housing wall, which space is often desired for technical lubricating reasons.

However, in various cases of use it would be necessary to reduce this space to the smallest possible dimension, for example if devices or the like arranged next to or under the transmission leave insufficient space for the gearing. Such a case exists for example in axle drive units for railway vehicles, such as street cars and the like, where there is a trend toward so called low-floor cars. From this results a demand for a transmission built on the one hand to store, because of high drive performances, a large diameter bevel-gear and, on the other hand, however, to keep the bottom wall of the transmission as close as possible to the gear.

Therefore, the purpose of the present invention is to provide a transmission of the above-mentioned type such that the (largest) gear is to be arranged as close as possible to the radially adjacent housing wall or the bottom wall of the housing, so that substantially only the diameter of the (largest) gear and the wall thickness in this area are decisive in determining the outside dimensions of the housing in the respective radial direction.

This purpose is attained with an axle support structure which significantly reduces the outside dimension of the housing by the otherwise existing radial distance between the gear and the housing wall.

A preferred field of application for the invention is as an axle drive unit for railway vehicles. The drive shaft for such units can thereby be a hollow shaft surrounding the wheel-set axle. The housing wall forms in these cases the base or bottom wall of the transmission housing. The invention assures that the smallest possible distance exists between the axis of the hollow shaft or the wheel-set axle and the underside of the transmission housing, while simultaneously providing sufficient safety against leakage at various points in the transmission housing forming an oil pan.

A further advantage of the inventive construction of the transmission housing is in the savings in weight, a plus point which, particularly in the case of railway vehicles, is not to be undervalued.

BRIEF DESCRIPTION OF THE DRAWINGS

The invention will be described hereinbelow with reference to one exemplary embodiment illustrated in the three figures, of which FIG. 1 is a vertical cross-sectional view of a conventional hollow shaft-bevel gear transmission;

FIG. 2 is a similar vertical cross-sectional view of a hollow shaft-bevel gear transmission embodying an inventive bearing; and FIG. 3 is a fragmentary view of the transmission illustrated in FIG. 2.

DETAILED DESCRIPTION

A hollow shaft 2 is rotatably supported in roller bearings 3, 4 in a housing 1 of a conventional hollow shaft-bevel gear transmission (FIG. 1). A bevel gear 5 is fixedly mounted to the hollow shaft 2, which bevel gear 5 is in meshed engagement with a bevelled-pinion gear 6 driven by a motor (not shown). The rotary movement is transmitted onto a wheel-set axle 8 through an elastic and/or jointed coupling (also not illustrated, see U.S. Pat. Nos. 4,409,904 and 4,697,527), which is connected to the hollow shaft 2 by means of a gudgeon coupling 7. The wheel-set axle 8 is supported in a bogie of a railway vehicle. The wheels 9, of which only one is shown in FIG. 1, are secured to opposite ends of the wheel-set axle.

In order to be able to install the hollow shaft 2 with the bevel gear 5 together in an axial direction into the housing 1, the outer ring of the bearing 4 is not like the outer ring of the bearing 3 received in a housing bore 11. Instead, the outer ring of the bearing 4 is received in a bore 13 of a bearing bracket 12, which bearing bracket is received in a second housing bore 14. The housing bore 14 has a diameter D1 which is only slightly greater than the outside diameter D2 of the bevel gear 5. Aside from the roller bearings 3, 4, lids 17 with seals 18 are also provided.

The bearing bracket 12 is fastened to the housing 1 with screws 15, which are arranged on a graduated circle 16 surrounding the housing bore 14. The housing 1 has for this purpose in this area a thickened area 19 compared with the otherwise existing wall thicknesses B. A radial spacing C1 between the bevel gear 5 and the base or bottom wall 20 of the housing 1 results therefrom. This spacing C1 is decisive for determining the structural height of the transmission up to the axis A1 of the wheel-set axle or for the so called ground clearance F between the transmission housing and the upper edge of the rail.

One embodiment with a reduced structural height or with a greater ground clearance F is illustrated in FIG. 2. The axis A2 of the second bearing bore 14 or of the bearing bracket 12 is shifted upwardly by an amount E compared with the common axis A1 of the bore 13, hollow shaft 2 and wheel-set axle 8. This eccentric arrangement of the bore 13 in the bearing bracket 12 permits an orienting of the base 20 higher up to a very small distance C2 from the bevel gear 5, with material of the base 20, if needed, being machined/removed in the area indicated by the reference numeral 21.

The magnitude of the amount E depends among others on the thickened area 19. Same can be reduced locally, if the lower screws 15', 15" are arranged on the graduated circle 16 on both sides of an imaginary plane 22 containing the two axes A1 and A2 (FIG. 3). Care must be taken that the lowermost point 23 of the bore 13 lies sufficiently above the base 20 (measurement G), that the sum of this measurement G and the wall thickness B results in a sufficiently wide sealing surface 24 between the housing 1 and the bearing bracket 12.

The invention is not to be limited to the exemplary embodiment of a "transmission for railway vehicles". Rather, it can be applied to all spur-gear, bevel-gear and worm gear transmissions, in which a shaft, which has at least one gear or the like, must be installed in an axial direction of the housing and this installation opening is closed off with a bearing bracket or the like.

The embodiments of the invention in which an exclusive property or privilege is claimed are defined as follows:

1. In combination in a transmission for use as an axle drive unit for a railway vehicle: a shaft, a gear provided on said shaft, a transmission housing having side walls and a bottom wall, and support means for supporting said shaft carrying said gear, said support means including a bearing bracket and including a first roller bearing and a second roller bearing each having an outer ring, said outer ring of said first roller bearing being arranged in a corresponding first housing bore in said transmission housing and said outer ring of said second roller bearing being arranged in a corresponding bore of said bearing bracket, said bearing bracket being centered in a corresponding circular second housing bore in said transmission housing, the diameter of said second housing bore, in order to permit an axial introduction of said shaft into said transmission housing, being at least as large as the outside diameter of said gear, the improvement wherein said transmission housing is free of structure projecting below a plane containing said bottom wall, wherein a first axis of said first housing bore and a second axis of said second housing bore are radially offset in a first direction and by a first amount with respect to one another, said first axis being oriented closer to said bottom wall of said transmission housing than said second axis, and wherein a third axis of said bore in said bearing bracket is radially offset with respect to said second axis by the same first amount and in the same first direction so that said third axis will be coaxial with said first axis of said first housing bore, said gear having a radius greater than a radial distance from said third axis to a lowermost surface portion of said second housing bore and less than a radial distance from said third axis to said bottom wall so that the outer perimeter of said at least one gear on said shaft is immediately adjacent said bottom wall and is below said lowermost surface portion of said second housing bore to thereby facilitate an optimization of a minimum spacing between said first axis and an underside of said bottom wall of said transmission housing.

2. The transmission according to claim 1, in which the bearing bracket is secured to said transmission housing by means of screws arranged on a graduated circle surrounding said second housing bore, wherein an imaginary plane, which contains said first and second axes of said first and second housing bores, extends between two screws arranged on said graduated circle.

3. The transmission according to claim 2, wherein an inner wall surface of said bottom wall is oriented by a second amount lower than said lowermost surface portion of said second housing bore, such that the sum of said second amount and a wall thickness of said bottom wall results in a sufficiently wide sealing surface in the area of said graduated circle.

4. The transmission according to claim 1, wherein said gear on said shaft is a bevel gear and is the largest gear in said transmission housing.

* * * * *